Oct. 30, 1928.
T. J. NOACK
1,689,402
MOWING MACHINE
Filed Oct. 19, 1926   2 Sheets-Sheet 1
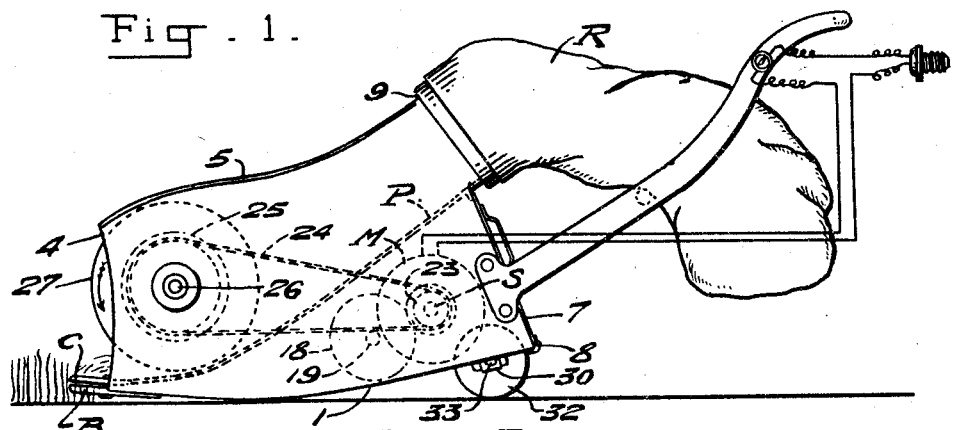
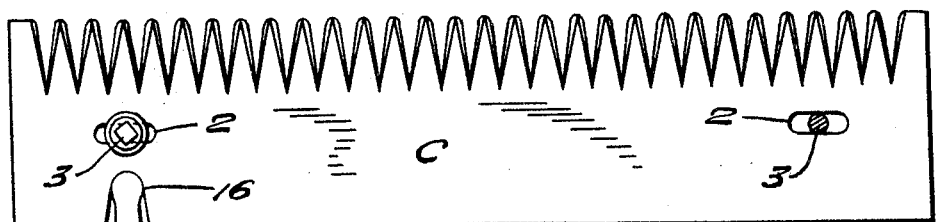
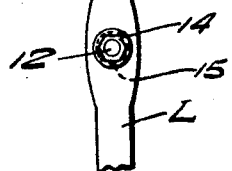
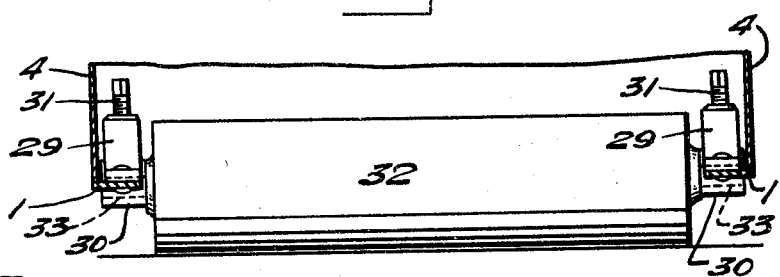
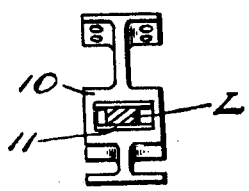
Inventor
Theodore John Noack
By Watson E. Coleman.
Attorney Oct. 30, 1928.

T. J. NOACK

MOWING MACHINE

Filed Oct. 19, 1926

Inventor
Theodore John Noack

By Watson E. Coleman.

Attorney

Patented Oct. 30, 1928.

1,689,402

UNITED STATES PATENT OFFICE.

THEODORE JOHN NOACK, OF PHOENIX, ARIZONA, ASSIGNOR OF ONE-HALF TO GRACE KETCHAM, OF PHOENIX, ARIZONA.

MOWING MACHINE.

Application filed October 19, 1926. Serial No. 142,701.

This invention relates to a mowing machine and has relation more particularly to an apparatus of this kind especially designed and adapted for use in connection with lawns, and it is an object of the invention to provide a machine of this kind provided with means for effectively collecting and catching grass and the like after being cut.

Another object of the invention is to provide a device of this kind wherein the cutting mechanism and the gathering or collecting mechanism are power driven and preferably through the instrumentality of an electric motor.

A further object of the invention is to provide a machine of this kind which, in addition to being effectively employed in the cutting of grass, may also be used with equal facility in the collecting of leaves or the like which may be upon the lawn.

The invention also has for an object to provide a machine of this kind with a collecting or gathering mechanism including a rotary brush operating to sweep the cut grass and the like rearwardly of the machine and into a suitably positioned collecting receptacle.

The invention consists in the details of construction and in the combination and arrangement of the several parts of my improved mowing machine whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view in side elevation illustrating a mowing machine constructed in accordance with an embodiment of my invention, the operating circuit being shown diagrammatically;

Figure 4 is a fragmentary sectional view taken substantially on the line 4—4 of Figure 2, looking in the direction of the arrow;

Figure 5 is a fragmentary view in top plan with a part in section illustrating the movable cutter bar and the associated operating lever;

Figure 6 is a view partly in elevation and partly in section illustrating the guide shoe for the lever.

Figure 2:
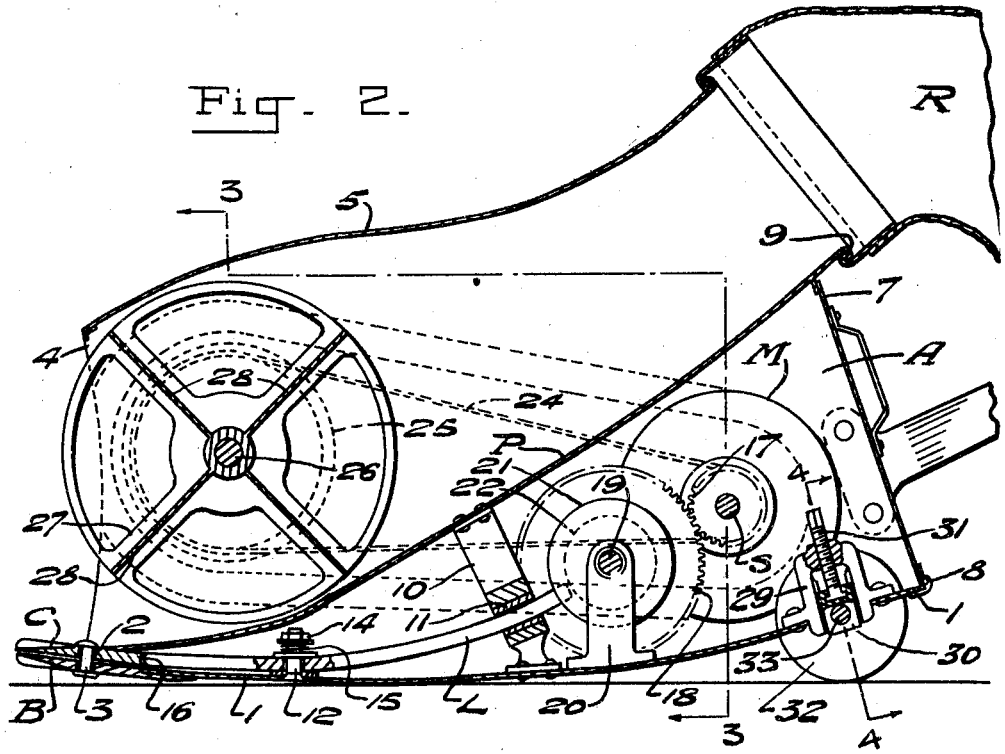
Figure 2 is a vertical sectional view taken through the structure as illustrated in Figure 1.
Figure 3:
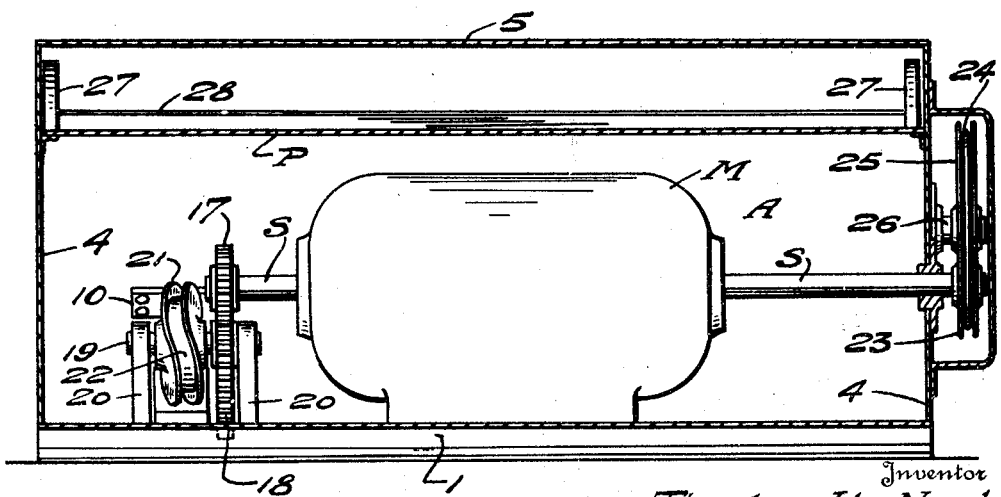
Figure 3 is a sectional view taken substantially on the line 3—3 of Figure 2, looking in the direction of the arrow.

As disclosed in the accompanying drawings, 1 denotes a bottom or glide plate of desired dimensions and which is disposed on a predetermined curvature in the direction of travel of the machine. The forward marginal portion of the bottom or glide plate 1 has fixed thereto a stationary cutter bar B extending substantially entirely across the plate.

Coacting with the cutter bar B is the movable cutter bar C superimposed thereon and provided adjacent to its opposite end portions with the longitudinally directed slots 2 through which are disposed the guide bolts 3 carried by the bar B. These bolts 3 and the coacting slots 2 provide means to assure the desired reciprocation of the bar C.

The side marginal portions of the bottom or glide plate 1 are defined by the upstanding side walls 4 with the upper marginal portions of which is associated a top or cover member 5. The forward or front end of the housing afforded by the side walls 4 and the top or cover member 5 is open.

Within the housing is a partition P interposed between the side walls 4 and extending on an upward and rearward incline from a point immediately above the movable cutter bar C to the rear of the housing, the rear face of the housing between the glide or bottom plate 1 and the partition P being closed by the upwardly swinging trap or door 7 hingedly connected, as at 8, to the rear marginal portion of the plate 1.

The interior of the housing above the partition P provides a chamber to facilitate the collection of the cut grass, leaves or the like and the rear of said chamber is provided, as at 9, with means whereby a bag or other suitable receptacle R may be applied to receive such cut grass and kindred refuse.

Interposed between the partition P and the bottom or glide plate 1 is a post 10 provided with a horizontally disposed guide shoe 11 in which operates the rear end portion of a lever L. This lever L, as herein disclosed, is disposed longitudinally on a predetermined curvature and has its central portion freely mounted on an upstanding stud 12 carried by the plate 1 whereby the lever may swing or oscillate in a horizontal direction transversely of the direction of travel of the machine.

The stud 12 extends a desired distance above the applied lever L and has engaged upon the upper portion thereof the nut 14. Interposed between the nut 14 and the pivoted portion of the lever L is a spring 15 which constantly urges the lever L toward the plate 1 yet permits the same to have limited upward movement under tension as working conditions may require.

The forward end portion of the lever L is operatively engaged, as at 16, with an end portion of the cutter bar C whereby the oscillating or swinging movement of the lever L will effect the desired reciprocation of the bar C to effect a required cutting action.

Positioned within the rear portion of the lower chamber A of the housing is an electric motor M. The shaft S of this motor has fixed to one extended end portion a gear 17 meshing with a larger gear 18 carried by the shaft 19. This shaft 19 is rotatably supported by the spaced posts 20 mounted upon the plate 1 and said shaft 19 carries a wheel 21 provided in its periphery with a continuous cam groove 22 in which is received the inner end portion of the lever L so that as the shaft S rotates, the wheel 21 will impart the requisite swinging or oscillating movement to the lever L.

As particularly illustrated in the accompanying drawings, the guide shoe 11 hereinbefore referred to is positioned in advance of but in relatively close proximity to the wheel 21.

The opposite end portion of the shaft S extends through and beyond a side wall 4 and to such extended portion is fixed a pulley 23 around which is disposed a drive belt 24 also disposed around a larger pulley 25 carried by the extended portion of a fan shaft 26. This shaft 26 is rotatably supported by the side walls 4, and has fixed thereto within the upper chamber of the machine immediately adjacent to the side walls 4 the spiders 27 connected by the blades 28 interposed therebetween and radial to the shaft 26.

During a working operation, as the grass is cut, the fan within the entrance portion of the upper chamber will operate to cause said severed grass and other refuse to pass upwardly and rearwardly through the chamber and be received within the bag or receptacle R hereinbefore referred to.

By rendering the cutting bar C inoperative, as by removing the lever L, the machine may be used for the collection only of leaves or the like upon a lawn.

The rear portion of the plate 1 adjacent each of the side walls 4 has secured thereto a boxing 29 in which is adjustably mounted a bearing 30, said bearing being raised or lowered as desired through the instrumentality of an adjusting screw 31. The rear portion of the plate 1 is also cut away to provide for the proper placing of the supporting roller 32 carried by the shaft 33 each end of which is engaged with a bearing 30.

The roller 32 provides supporting means for the rear portion of the machine while the forward portion is supported directly by the bottom or glide plate 1. By adjusting the roller 32 toward or from the plate 1, the location of the cutter bars B and C may be regulated or varied as desired with respect to the ground line.

From the foregoing description it is thought to be obvious that a mowing machine constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

A mowing machine comprising a housing having its forward end open, a cutting mechanism carried by the bottom of the housing at the forward open end of the housing, a partition within the housing extending rearwardly from the cutting mechanism and dividing the housing into an upper chamber and a lower chamber, a shaft within the upper chamber and supported by the side walls of the housing closely adjacent to the open end of the housing, fan blades carried by said shaft, a motor within the lower chamber, a driving connection between the motor and cutting mechanism, means for rotating the shaft from the motor, the upper chamber of the housing rearwardly of the shaft and blades being free and unobstructed, the rear of the upper chamber having means for connection with a collecting receptacle and into which the upper compartment is adapted to discharge.

In testimony whereof I hereunto affix my signature.

THEODORE JOHN NOACK.